United States Patent
Son et al.

(10) Patent No.: US 12,035,202 B2
(45) Date of Patent: Jul. 9, 2024

(54) METHOD AND APPARATUS FOR PROCESSING REQUESTS FOR LOCATION INFORMATION SERVICE OF TERMINALS CONCURRENT IN MOBILE COMMUNICATION SYSTEM

(71) Applicant: Samsung Electronics Co., Ltd., Suwon-si (KR)

(72) Inventors: Jungje Son, Suwon-si (KR); Youngkyo Baek, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 17/619,640

(22) PCT Filed: Jun. 15, 2020

(86) PCT No.: PCT/KR2020/007690
§ 371 (c)(1),
(2) Date: Dec. 16, 2021

(87) PCT Pub. No.: WO2020/256362
PCT Pub. Date: Dec. 24, 2020

(65) Prior Publication Data
US 2022/0322041 A1  Oct. 6, 2022

(30) Foreign Application Priority Data
Jun. 17, 2019  (KR) .................. 10-2019-0071829

(51) Int. Cl.
*H04W 4/029* (2018.01)
*H04W 28/02* (2009.01)
*H04W 88/18* (2009.01)

(52) U.S. Cl.
CPC ....... *H04W 4/029* (2018.02); *H04W 28/0215* (2013.01); *H04W 88/18* (2013.01)

(58) Field of Classification Search
CPC .. H04W 4/029; H04W 28/0215; H04W 88/18
See application file for complete search history.

(56) References Cited

U.S. PATENT DOCUMENTS 10,334,392 B2    6/2019  Mohamed et al.
10,932,098 B1 *  2/2021  Malhotra ................ H04M 3/56
(Continued)

FOREIGN PATENT DOCUMENTS

EP     3952604 A1 *  2/2022  ............ H04W 72/04
KR  10-2018-0022895 A   3/2018

OTHER PUBLICATIONS

European Patent Office, "Supplementary European Search Report," dated Jun. 22, 2022, in connection with European Patent Application No. 20826382.2, 9 pages.

(Continued)

*Primary Examiner* — Adam D Houston

(57) ABSTRACT

The present disclosure relates to a communication technique for combining, with IoT technology, a 5G communication system for supporting a higher data transmission rate beyond a 4G system, and a system therefor. The present disclosure may be applied to intelligent services (such as smart homes, smart buildings, smart cities, smart cars or connected cars, health care, digital education, retail businesses, security and safety related services, and the like) on the basis of 5G communication technologies and IoT-related technologies. Disclosed in the present invention is a method for processing location information of terminals concurrent in a mobile communication system.

14 Claims, 10 Drawing Sheets

(56) References Cited

U.S. PATENT DOCUMENTS

| | | |
|---|---|---|
| 11,457,331 B2* | 9/2022 | Zhu .................. H04L 67/303 |
| 11,502,800 B2* | 11/2022 | Zarifi ................ H04W 56/001 |
| 11,516,113 B2* | 11/2022 | Qian .................. H04L 45/24 |
| 2006/0293066 A1 | 12/2006 | Edge et al. |
| 2018/0192234 A1* | 7/2018 | Mohamed ........... H04W 4/08 |
| 2018/0343635 A1* | 11/2018 | Edge ................ H04W 88/08 |
| 2022/0007150 A1* | 1/2022 | Edge ................ H04W 4/029 |
| 2023/0247686 A1* | 8/2023 | Jeong ................ H04W 76/10 |
| | | 455/414.1 |
| 2024/0031889 A1* | 1/2024 | Liu .................. H04W 72/23 |

OTHER PUBLICATIONS

International Search Report and Written Opinion of the International Searching Authority in connection with International Application No. PCT/KR2020/007690 dated Sep. 15, 2020, 9 pages.

3GPP TS 23.273 V16.0.0 (Jun. 2019) Technical Specification, 3rd Generation Partnership Project, Technical Specification Group Services and System Aspects, 5G System (5GS) Location Services (LCS), Stage 2, (Release 16) Jun. 2019, 86 pages.

3GPP TS 38.305 V15.3.0 (Mar. 2019) Technical Specification, 3rd Generation Partnership Project, Technical Specification Group Radio Access Network, NG Radio Access Network (NG-RAN), Stage 2 functional specification of User Equipment (UE) positioning in NG-RAN, (Release 15) 69 pages.

3GPP TS 29.172 V15.0.0 (Jun. 2018) 3GPP TSG CN LCS, EPC LCS Protocol (ELP) between the GMLC and the MME, SLG interface (Release 15) Jun. 2018, 47 pages.

* cited by examiner

METHOD AND APPARATUS FOR PROCESSING REQUESTS FOR LOCATION INFORMATION SERVICE OF TERMINALS CONCURRENT IN MOBILE COMMUNICATION SYSTEM

CROSS-REFERENCE TO RELATED APPLICATIONS

This application is a 371 National Stage of International Application No. PCT/KR2020/007690, filed Jun. 15, 2020, which claims priority to Korean Patent Application No. 10-2019-0071829, filed Jun. 17, 2019, the disclosures of which are herein incorporated by reference in their entirety.

BACKGROUND

1. Field

The disclosure relates to a method and apparatus for providing a location information service associated with a user equipment (UE) in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

SUMMARY

An aspect of the disclosure is to provide a method and apparatus for performing processing so that a mobile communication user, a mobile communication system operator, or a mobile communication service provider can request the location information of a user equipment (UE) from a mobile communication system, in order to provide a service or for other needs, and effectively receives the location information of the UE. If a plurality of location information requests are received via different mobile communication service providers or the like, a mobile communication system may select a gateway mobile location centre (GMLC) (a location information processing gateway) that processes a location information request and performs connection to the mobile communication system.

An aspect of the disclosure is to provide a method and apparatus for effectively performing processing when a GMLC performs connection to a mobile communication system and processes a location information request, by selecting the same GMLC for processing location information requests if the location information requests have identical or similar service requirements or require the location information of the same UE.

The technical subjects pursued in the disclosure may not be limited to the above mentioned technical subjects, and other technical subjects which are not mentioned may be clearly understood, through the following descriptions, by those skilled in the art to which the disclosure pertains.

A method performed by a UE location information processing gateway (a gateway mobile location centre (GMLC)) of a mobile communication system according to an embodiment of the disclosure may include receiving, from a network entity that requires location information of a user equipment (UE), a message that requests the location information of the UE; transmitting a message that requests the location information of the UE to an access and mobility management function (AMF) associated with the UE; receiving a message including the location information of the UE from the AMF; and transferring, to the network entity, a message including the location information of the UE received from the AMF.

In addition, the operation of transmitting the message that requests the location information of the UE to the AMF may include an operation of transmitting, to a unified data management (UDM), a message for checking whether the GMLC is capable of providing the location information of the UE to the network entity; an operation of receiving, from the UDM, a message including confirmation information indicating that the GMLC is capable of providing the location information of the UE to the network entity; and an operation of transmitting, based on the confirmation information, the message that requests the location information of the UE to the AMF.

In addition, the operation of transmitting the message that requests the location information of the UE to the AMF may further include receiving information associated with the AMF from a unified data management (UDM). In addition, the operation of transmitting the message that requests the location information of the UE to the AMF may include identifying whether another GMLC that is processing the location information of the UE is present; if another GMLC that is processing the location information of the UE is present, transmitting a message that requests the location information of the UE to the another GMLC; receiving a message including the location information of the UE from the another GMLC; and transmitting the message that requests the location information of the UE to the AMF if another GMLC that is processing the location information of the UE is not present.

In addition, the network entity may be one of a location service client (LCS) or a network exposure function (NEF).

In addition, the operation of identifying whether another GMLC that is processing the location information of the UE is present may include an operation of transmitting, to a unified data management (UDM), a message that requests identifying whether another GMLC that is processing the location information of the UE is present; an operation of receiving, from the UDM, a message including information associated with whether another GMLC that is processing the location information of the UE is present; and an operation of identifying, based on the information, whether another GMLC that is processing the location information of the UE is present.

In addition, the message that requests the location information of the UE and is received from the network entity may include at least one of the ID (identification number) of the UE, service requirements of location information, configuration information for expressing location information, a client type that requests location information, or a condition for reporting location information.

According to an embodiment of the disclosure, if a mobile communication system processes location information requests with similar or same service requirements, the mobile communication system can select the same GMLC for processing the location information requests associated with the same UE, can minimize necessary connection to the mobile communication system including a UE and a network entity when the GMLC processes a plurality of location information requests associated with UEs, and thus, can efficiently process resources related to establishing and managing a connection to the mobile communication system, which is necessary for processing the location information requests.

Advantageous effects obtainable from the disclosure may not be limited to the above mentioned effects, and other effects which are not mentioned may be clearly understood, through the following descriptions, by those skilled in the art to which the disclosure pertains.

DETAILED DESCRIPTION

Figure 1:
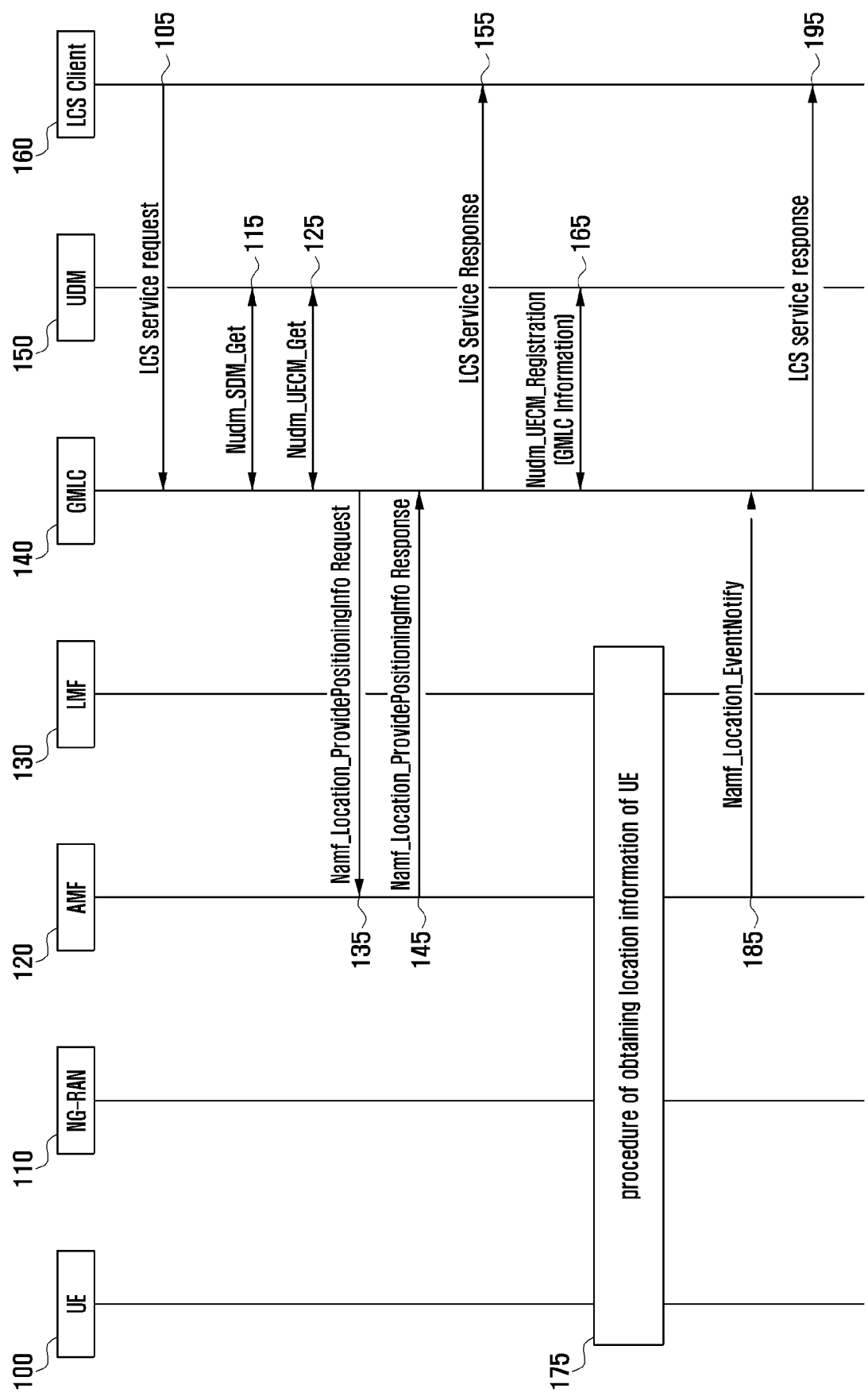
FIG. 1 is a diagram illustrating a procedure of processing a location information request associated with a user equipment (UE) in response to a request from a location service (LCS) client and a procedure of storing information associated with a GMLC that processes the location information request associated with the UE, according to an embodiment of the disclosure.

Hereinafter, embodiments of the disclosure will be described in detail with reference to the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

FIG. 1 is a diagram illustrating a procedure of processing a location information request associated with a user equipment (UE) in response to a request from a location service (LCS) client and a procedure of storing information associated with a GMLC that processes the location information request associated with the UE, according to an embodiment of the disclosure.

In operation 105, an external location information service client (LCS client) 160 may transmit LCS Service Request that requests the location information of a user equipment (UE) 100 to a gateway mobile location centre (GMLC) (a location information processing gateway) 140 of a mobile communication system.

In this instance, the LCS client 160 may select the GMLC 140 based on the address of a GMLC set in advance, and may transmit LCS Service Request to the GMLC 140. In this instance, the LCS Service Request may include the ID (identification number) of the UE 100 of which the location information is requested, service requirements of location information, configuration information for expressing location information, a client type that requests location information, periodic location information reporting, or a condition for reporting location information such as reporting of location information when a predetermined condition is satisfied.

In operation 115, the GMLC 140 that receives the LCS Service Request from the LCS client 160 in operation 105 may perform a Nudm SDM Get procedure with the UDM 150 that contains subscriber information of the UE 100, in order to identify privacy information of the UE 100 which shows whether provision of the location information of the UE 100 to the corresponding LCS client 160 is allowed.

In operation 125, after identifying whether the LCS client 160 is a client that is allowed to request the location information of the UE 100, the GMLC 140 may perform a Nudm UECM Get procedure with the UDM 150 in order to identify the address of the access and mobility management function (AMF) 120 that manages connection to the UE 100.

According to another embodiment of the disclosure, in operation 115 or operation 125, the GMLC 140 may identify information indicating whether another GMLC that is processing the location information of the UE 100 is present in the UDM 150, and if the UE 100 is roaming, the GMLC 140 may identify information associated with another GMLC that is processing the location information of the UE 100 in the roaming network of the UE 100.

In operation 135, if the GMLC 140 does not receive the information associated with another GMLC from the UDM 150, and receives the address of the AMF 120 that manages connection of the UE 100, the GMLC 140 may transmit Namf_Location_ProvidePositioningInfo Request that requests the location information of the UE 100 to the address of the AMF 120 identified in operation 125.

If the UE 100 is roaming to the network of another operator, and information associated with a GMLC in the roaming network to which the UE 100 is roaming is not received via the UDM 150 in operation 125, information associated with a GMLC in the roaming network may be received via a network repository function (NRF). In this instance, the GMLC 140 that receives the LCS Service Request may perform a procedure of transferring information associated with the LCS Service Request to the GMLC in the roaming network, and after the procedure, the GMLC in the roaming network may perform a procedure of requesting the location information of the UE 100 from the AMF 120 that manages the UE 100.

In operation 145, if reporting of the location information of the UE 100 is periodic location information reporting or location information reporting when a predetermined condition is satisfied, the AMF 120 that receives, from the GMLC 140, the Namf_Location_ProvidePositioningInfo Request that requests the location information of the UE 100, may transmit, to the GMLC 140 that transmits the Namf_Location_ProvidePositioningInfo Request, Namf_Location_ProvidePositioningInfo Response including information indicating that the location request including the corresponding location information reporting condition is successfully received and a procedure of obtaining the location information is to be performed according to the location information request.

In operation 155, the GMLC 140 that receives the Namf_Location_ProvidePositioningInfo Response may transmit, to the LCS client 160 that has requested the same, LCS Service Response including information indicating that the location information request that includes the corresponding location information reporting condition is successfully transmitted, and a procedure of obtaining the location information is to be performed according to the corresponding location information request.

In operation 155, if the GMLC that receives the Namf_Location_ProvidePositioningInfo Response is a GMLC in a roaming network, the corresponding GMLC may transmit, to the GMLC 140 that has performed a procedure of transferring the information of the LCS Service Request received from the LCS client 160 in operation 135, information indicating that the location information request including the corresponding location information reporting condition is successfully transmitted and a procedure of obtaining the location information is to be performed according to the corresponding location information request, and the GMLC 140 that receives the same may transmit LCS Service Response including the information to the LCS client 160.

In operation 165, the GMLC 140 may store Nudm_UECM_Registration(GMLC Information) indicating that requesting of the location information associated with the UE 100 is being performed, in the UDM 150 as subscription information of the UE 100 for a location information service if the GMLC 140 does not receive information associated with a GMLC that is requesting the location information of the UE 100 via the UDM 150 in operation 115 or operation 125 after the GMLC 140 transmits the LCS Service Response to the LCS client 160 in operation 155, or if additional information registration, such as another location information processing, or the like, is needed due to service requirements of different location information, after the GMLC 140 transmits the LCS Service Response to the LCS client 160 in operation 155. In this instance, Nudm_UECM_Registration(GMLC Information) may include the address of the GMLC 140, service requirements required by the location information request, and the like.

In operation 175, after the AMF 120 receives the Namf_Location_ProvidePositioningInfo Request in operation 135, the AMF 120 may perform a procedure of obtaining the location information according to the location information reporting condition, with the location management function (LMF) 130 that processes obtaining of the location information from the UE 100, the UE 100 of which the location is requested, and the base station 110.

In operation 185, if the AMF 120 receives the location information of the UE 100 from the LMF 130, the AMF 120 may transmit Namf_Location_EventNotify to the GMLC 140 so as to transfer the location information of the UE 100 received from the LMF 130.

In operation 195, the GMLC 140 that receives the same may transfer LCS Service Response including the location information of the UE 100 to the LCS client 160. If the GMLC that receives the Namf_Location_EventNotify is a GMLC in a roaming network, the GMLC in the roaming network may perform a procedure of transferring the location information of the UE 100 to the GMLC 140 that has received the location information request associated with the UE 100 from the LCS client 160, and the GMLC 140 that receives the location information of the UE 100 may transfer the LCS Service Response to the LCS client 160.

Figure 2:
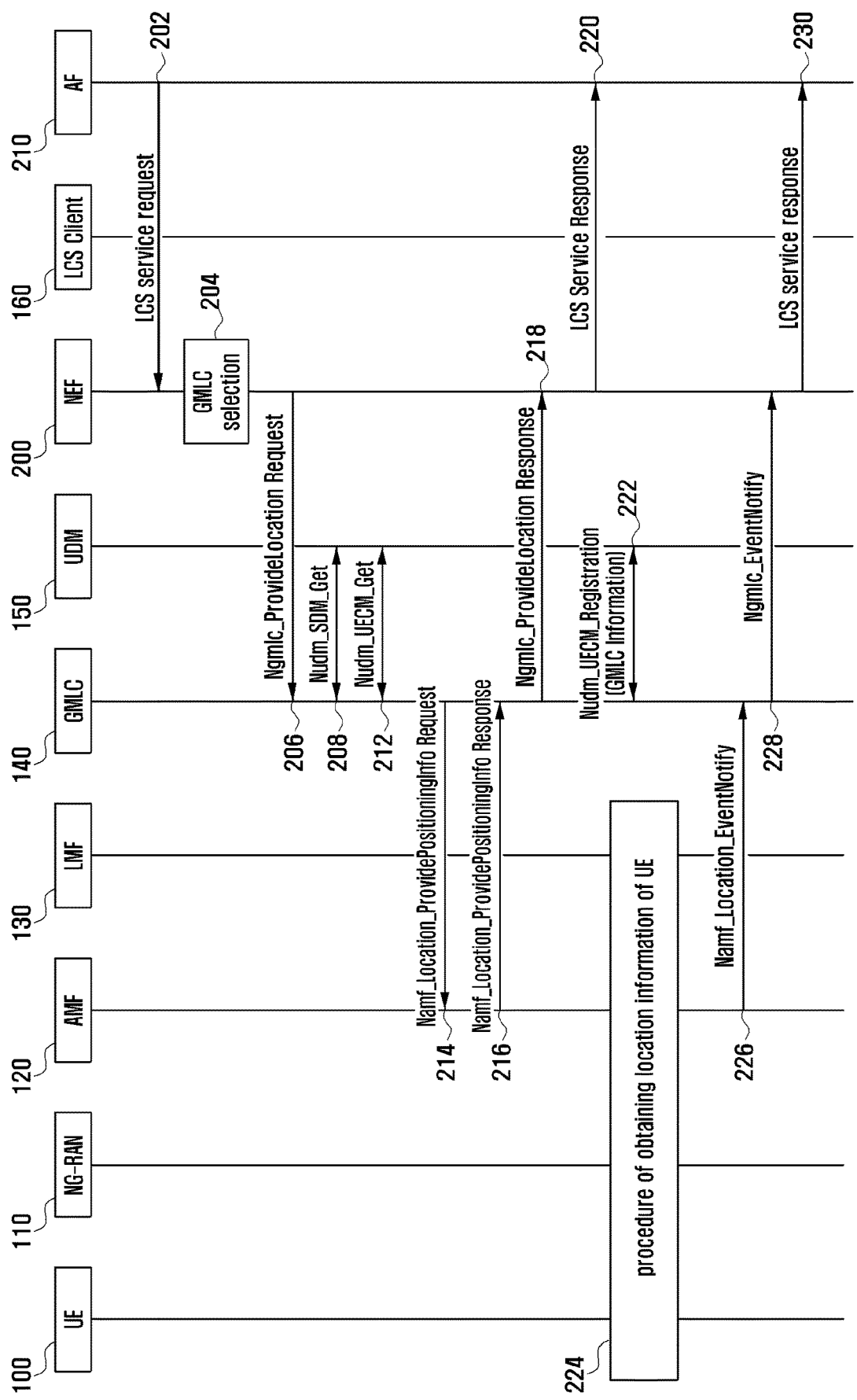
FIG. 2 is a diagram illustrating a procedure of processing a location information request associated with a UE in response to a request from an application function (AF) and a network exposure function (NEF) and a procedure of storing information associated with a GMLC that processes the location information request associated with the UE, according to an embodiment of the disclosure.

FIG. 2 is a diagram illustrating a procedure of processing a location information request associated with a UE in response to a request from an application function (AF) and a network exposure function (NEF), and a procedure of storing information associated with a GMLC that processes the location information request associated with the UE, according to an embodiment of the disclosure.

In operation 202, an external application function (AF) 210 transmits LCS Service Request that requests location information of the UE 100 to an NEF 200.

In this instance, the AF 210 may transmit the LCS Service Request to the NEF 200 based on the address of the NEF 200 set in advance. In this instance, the LCS Service Request may include the ID (identification number) of the UE 100 of which the location information is requested, service requirements of location information, configuration information for expressing location information, a client type that requests location information, periodic location information reporting, or a condition for reporting location information such as reporting of location information when a predetermined condition is satisfied.

In operation 204, the NEF 200 that receives the LCS Service Request from the AF 210 in operation 202 may select the GMLC 140 using the address of a GMLC set in advance. In addition, if the address of the GMLC is not set, the NEF 200 may transmit a request to an NRF, so as to obtain the address of the GMLC 140 to which the location information of the UE 100 is to be transferred. According to another embodiment of the disclosure, the NEF 200 may obtain, from the UDM 150, the address of the GMLC 140 that is processing a location information request associated with the UE 100.

In operation 206, the NEF 200 may transmit Ngmlc_ProvideLocation Request that requests the location information of the UE 100 to the selected GMLC 140.

In operation 208, the GMLC 140 that receives the Ngmlc_ProvideLocation Request from the NEF 200 in operation 206 may perform a Nudm_SDM_Get procedure with the UDM 150 that contains subscriber information of the UE 100 in order to identify privacy information of the UE 100 which shows whether provision of the location information of the UE 100 to the LCS client 160 that requests the location information of the UE 100 is allowed.

In operation 212, after identifying whether the LCS client 160 is a client that is allowed to request the location information of the UE 100, the GMLC 140 may perform a Nudm_UECM_Get procedure with the UDM 150 in order to identify the address of the AMF 120 that manages connection to the UE 100.

According to another embodiment of the disclosure, in operation 208 or operation 212, the GMLC 140 may identify information indicating whether another GMLC that is processing the location information of the UE is present in the UDM 150, and the GMLC 140 may identify information associated with another GMLC that is processing the location information of the UE 100 in a roaming network of the UE 100 if the UE 100 is roaming.

In operation 214, if the GMLC 140 does not receive the information associated with another GMLC from the UDM 150, and receives the address of the AMF 120 that manages connection of the UE 100, the GMLC 140 may transmit Namf_Location_ProvidePositioningInfo Request that requests the location information of the UE 100 to the address of the AMF 120 identified in operation 212.

If the UE 100 is roaming to the network of another operator, and information associated with a GMLC in a roaming network to which the UE 100 is roaming is not received via the UDM 150 in operation 208 or operation 212, information associated with a GMLC in the roaming network may be received via an NRF. In this instance, the GMLC 140 that receives the Ngmlc_ProvideLocation Request may perform a procedure of transferring information associated with the LCS Service Request to the GMLC in the roaming network, and after the procedure, the GMLC in the roaming network may perform a procedure of requesting the location information of the UE 100 from the AMF 120 that manages the UE 100.

In operation 216, if reporting of the location information of the UE 100 is periodic location information reporting or location information reporting when a predetermined condition is satisfied, the AMF 120 that receives, from the GMLC 140, Namf_Location_ProvidePositioningInfo Request that requests the location information of the UE 100, may transmit Namf_Location_ProvidePositioningInfo Response including information indicating that the location request including the corresponding location information reporting condition is successfully received and a procedure of obtaining the location information is to be performed according to the location information request to the GMLC 140 that transmits the Namf_Location_ProvidePositioningInfo Request.

In operation 218, the GMLC 140 that receives the Namf_Location_ProvidePositioningInfo Response may transmit, to the NEF 200 that requests the same, Namf_Location_ProvideLocation response including information indicating that the location information request that includes the corresponding location information reporting condition is successfully transmitted, and a procedure of obtaining the location information is to be performed according to the corresponding location request.

If the GMLC that receives the Namf_Location_ProvidePositioningInfo Response in operation 216 is a GMLC in a roaming network, the corresponding GMLC may transmit, to the GMLC 140 that has received the Ngmlc_ProvideLocation Request from the NEF 200 in operation 206, information indicating that the location information request including the corresponding location information reporting condition is successfully transmitted and a procedure of obtaining the location information is to be performed according to the corresponding location information request, and the GMLC 140 that receives the same may transmit Ngmlc_ProvideLocation Request including the information to the NEF 200.

In operation 220, the NEF 200 that receives the Ngmlc_ProvideLocation Response may transmit, to the AF 210, LCS Service Response including information indicating that the location information request that includes the corresponding location information reporting condition is successfully transmitted and a procedure of obtaining the location information is to be performed according to the corresponding location information request.

In operation 222, after transmitting the Ngmlc_ProvideLocation Request to the NEF 200, the GMLC 140 may store Nudm_UECM_Registration(GMLC Information) indicating that requesting of the location information associated with the UE 100 is being performed, in the UDM 150 as subscription information of the UE 100 for a location information service. In this instance, Nudm_UECM_Registration(GMLC Information) may include the address of the GMLC 140, service requirements required by the location information request, and the like.

In operation 224, after the AMF 120 receives the Namf_Location_ProvidePositioningInfo Request in operation 214, the AMF 120 may perform a procedure of obtaining the location information according to the location information reporting condition, with the LMF 130 that processes obtaining of the location information from the UE 100, the UE 100 of which the location is requested, and the base station 110.

In operation 226, if the AMF 120 receives the location information of the UE 100 from the LMF 130, the AMF 120 may transmit Namf_Location_EventNotify to the GMLC 140 so as to transfer the location information of the UE 100 received from the LMF 130.

In operation 228, the GMLC 140 that receives the same may transfer Ngmlc_EventNotify including the location information of the UE 100 to the NEF 200. If the GMLC 140 that receives the Namf_Location_EventNotify is a GMLC in a roaming network, the GMLC in the roaming network may perform a procedure of transferring the location information of the UE 100 to the GMLC 140 which has received the location information request associated with the UE 100 from the NEF 200, and the GMLC 140 that receives the location information of the UE 100 may transfer Ngmlc_EventNotify including the location information of the UE 100 to the NEF 200.

In operation 230, the NEF 200 that receives Ngmlc_EventNotify from the GMLC 140 may transfer LCS Service Response to the AF 210.

Figure 3:
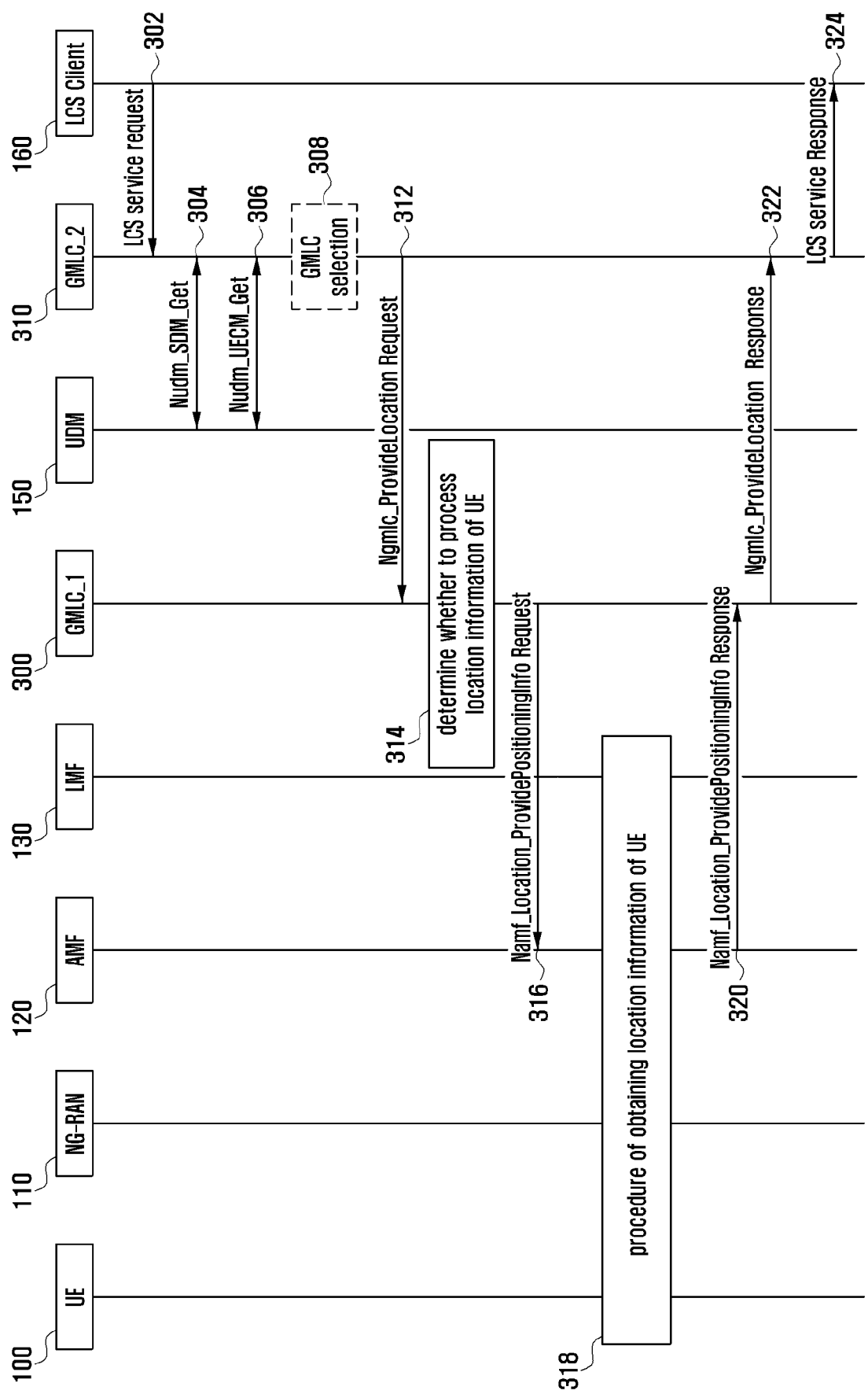
FIG. 3 is a diagram illustrating a procedure of processing a location information request associated with a UE and a procedure of selecting a GMLC that processes the location information request associated with the UE, according to an embodiment of the disclosure.

FIG. 3 is a diagram illustrating a procedure of processing the location information request associated with a UE and a procedure of selecting a GMLC that processes the location information request associated with the UE, according to an embodiment of the disclosure.

In operation 302, the external location information service client (LCS client) 160 may transmit LCS Service Request that requests the location information of the UE 100 to GMLC_2 310 (a location information processing gateway) of a mobile communication system.

In this instance, the LCS client 160 may select the GMLC_2 310 based on the address of a GMLC set in advance, and may transmit LCS Service Request to the GMLC_2 310. In this instance, the LCS Service Request may include the ID (identification number) of the UE 100 of which the location information is requested, service requirements of location information, configuration information for expressing location information, a client type that requests location information, periodic location information reporting, or a condition for reporting location information such as reporting of location information when a predetermined condition is satisfied.

According to another embodiment, in operation 302, the GMLC_2 310 of the mobile communication system may receive LCS Service Request including the location information request associated with the UE 100 from an AF via an NEF.

In operation 304, the GMLC_2 310 that receives the LCS Service Request in operation 302 may perform a Nudm_SDM_Get procedure with the UDM 150 that contains subscriber information of the UE 100, in order to identify privacy information of the UE 100 which shows whether provision of the location information of the UE 100 to the corresponding LCS client 160 is allowed.

In operation 306, after identifying whether the LCS client 160 is a client that is allowed to request the location information of the UE 100, the GMLC_2 310 may perform a Nudm_UECM_Get procedure with the UDM 150 in order to identify the address of the AMF 120 that manages connection to the UE 100.

According to another embodiment of the disclosure, in operation 304 or operation 306, the GMLC (GMLC_2 310) may identify information indicating whether another GMLC that is processing the location information of the UE 100 is present in the UDM 150, and if the UE 100 is roaming, the GMLC may identify information associated with another GMLC that is processing the location information of the UE 100 in the roaming network of the UE 100.

In operation 312, if the GMLC_2 310 receives, from the UDM 150, the information associated with GMLC_1 300 which is another GMLC that is processing the location information request associated with the UE 100, the GMLC_2 310 may transmit Ngmlc_ProvideLocation Request for transferring the existing received location information request associated with the UE 100 to the GMLC_1 300. In this instance, the GMLC_2 310 may transfer the Ngmlc_ProvideLocation Request including the information associated with the AMF 120 that is performing connection to the UE 100.

In operation 314, the GMLC_1 300 that receives the Ngmlc_ProvideLocation Request may determine whether the location information request associated with the UE 100 included in the Ngmlc_ProvideLocation Request received from the GMLC_2 310 needs to be processed separately from the existing location information request that is being processed with the UE 100 or can be processed as information received via the existing location information request.

If the GMLC_1 300 determines that the location information request needs to be performed separately from the existing location information request, the GMLC_1 300 may perform a procedure of selecting the AMF 120 that is performing connection of the UE 100, based on information included in operation 312 or via communication with the UDM 150, and transmitting Namf_Location_ProvidePositioningInfo Request that requests the location information of the UE 100 to the AMF 120, in operation 316.

According to another embodiment of the disclosure, if it is determined that the location information request associated with the UE 100 included in the Ngmlc_ProvideLocation Request received from the GMLC_2 310 in operation 312 is capable of being processed concurrently with the existing location information request that is being performed in the UE 100 in operation 314, the GMLC_1 300 may not proceed with operation 316.

In operation 318, the AMF 120 that receives Namf_Location_ProvidePositioningInfo Request that requests the location information of the UE 100 from the GMLC_1 300 may perform a procedure of obtaining the location information according to the location information reporting condition, with the LMF 130 for processing obtaining of the location information from the UE 100, the UE 100 of which the location information is requested, and the base station 110.

In operation 320, if the AMF 120 receives the location information of the UE 100 from the LMF 130, the AMF 120 may transfer Namf_Location_ProvidePositioningInfo Response that transfers the location information of the UE 100 to the GMLC_1 300.

In operation 322, after receiving information associated with the Namf_Location_ProvidePositioningInfo Response, if the GMLC_1 300 determines that the corresponding location information also needs to be transferred to the GMLC_2 310 based on information that distinguishes an LCS service request message or information associated with the LCS client 160 or the AF to which the location information of the UE 100 is to be transferred, the GMLC_1 300 may transmit Ngmlc_ProvideLocation Response to the GMLC_2 310.

In operation 324, the GMLC_2 310 may transmit LCS Service Response or Ngmlc_ProvideLocation Response which indicates the location information of the UE 100 to the LCS client 160, an NEF, or the like, based on the Ngmlc_ProvideLocation Response received from the GMLC_1 300.

According to another embodiment of the disclosure, in operation 316, if reporting of the location information of the UE 100 is periodic location information reporting or location information reporting when a predetermined condition is satisfied, the AMF 120 that receives, from the GMLC (GMLC_1 300), Namf_Location_ProvidePositioningInfo Request that requests the location information of the UE 100, may transmit, to the GMLC_2 310 that transmits the Namf_Location_ProvidePositioningInfo Request via the method or the like illustrated in the embodiment of FIG. 1, Namf_Location_ProvidePositioningInfo Response including information indicating that the location request including the corresponding location information reporting condition is successfully received and a procedure of obtaining the location information is to be performed according to the location information request. The GMLC_1 300 that receives the Namf_Location_ProvidePositioningInfo Response may transmit, to the GMLC_2 310, Ngmlc_ProvideLocation Response including information indicating that the location request that includes the corresponding location information reporting condition is successfully transmitted and the corresponding location request is to be performed. The GMLC_2 310 may transmit LCS Service Response or Ngmlc_ProvideLocation Response to the LCS client 160 or the NEF, based on the information received from the GMLC_1 300.

Figure 4:
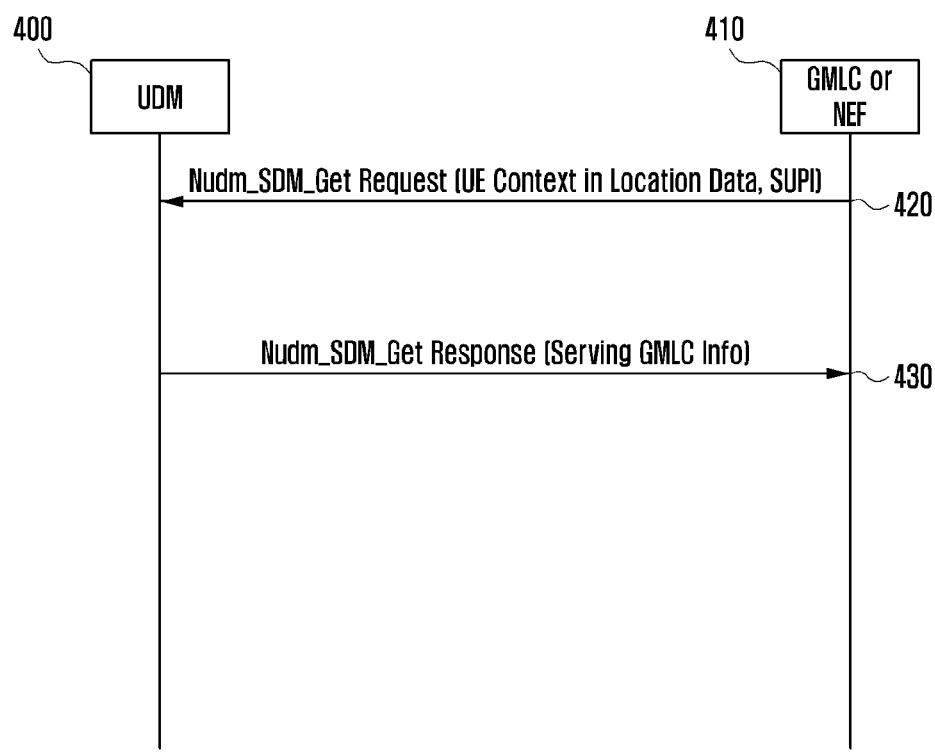
FIG. 4 is a diagram illustrating a procedure in which a GMLC or an NEF obtains information associated with a GMLC that processes the location information associated with a UE and a related parameter from a unified data management (UDM), according to an embodiment of the disclosure.

FIG. 4 is a diagram illustrating a procedure in which a GMLC or an NEF obtains information associated with a GMLC that processes the location information of a UE and a related parameter from a unified data management (UDM), according to an embodiment of the disclosure.

In operation 420, a GMLC or an NEF 410 may transmit Nudm_SDM_Get Request to a UDM 400 in order to request the information associated with the GMLC that processes the location information of the UE. In this instance, the Nudm_SDM_Get Request includes information indicating that the requested information is context related to a UE location service and/or information associated with a UE (e.g., UE identification information (e.g., subscription permanent identifier (SUPI), or the like). In the embodiment, the information indicating that the requested information is a context related to a UE location service is referred to as UE Context in Location Data.

If the UDM 400 receives the Nudm_SDM_Get Request that requests UE Context in Location Data from the GMLC or NEF 410 in operation 420, the UDM 400 may transfer GMLC information including the information associated with a GMLC that is processing the location information request associated with the UE and related service requirements (e.g., quality of service (QoS) or the like), or the like to the GMLC or NEF 410 in operation 430.

Table 1 below is an example of GMLC information.

| Subscription data type | Field | Description |
| --- | --- | --- |
| UE Context in Location Data | GMLC information | Indicates GLMC serving LCS request for the UE with QoS |

Figure 5:
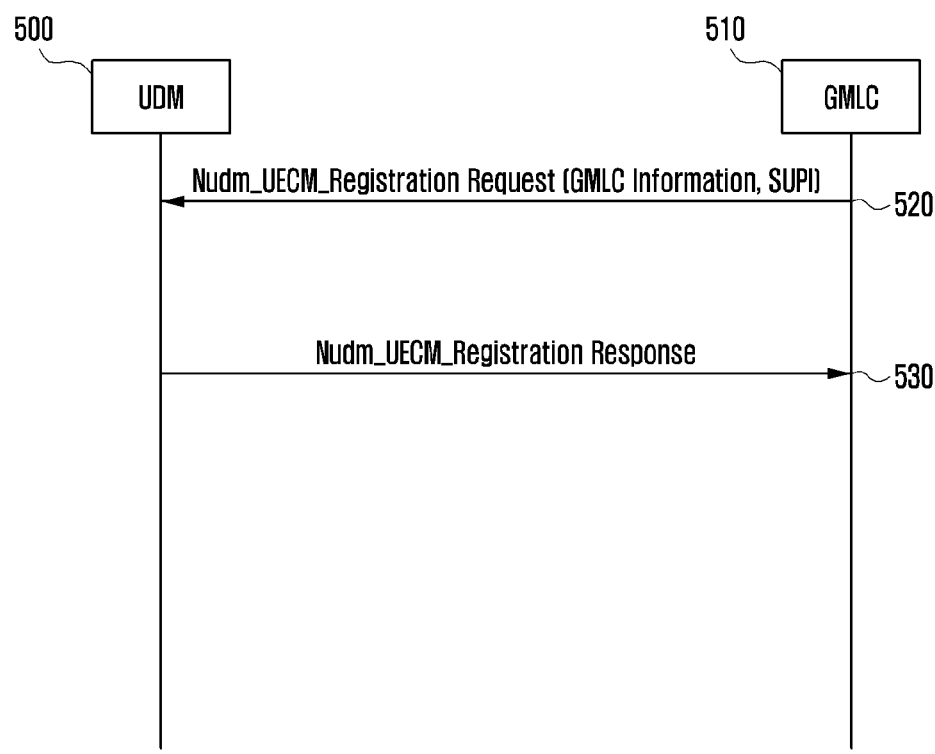
FIG. 5 is a diagram illustrating a procedure in which a GMLC stores, in a UDM, information associated with a GMLC that processes the location information associated with a UE, according to an embodiment of the disclosure.

FIG. 5 is a diagram illustrating a procedure in which a GMLC stores information associated with a GMLC that processes the location information of a UE, according to an embodiment of the disclosure.

In operation 520, a GMLC 510 transmits Nudm_UECM_Registration Request to a UDM 500 in order to store, in the UDM 500, the fact that the GMLC 510 is processing the location information of the UE. In this instance, via the Nudm_UECM_Registration Request, GMLC information including the information associated with the GMLC that is processing the location information request associated with the UE, related service requirements, or the like may be transferred. In this instance, the information associated with the GMLC may include the address or the ID (identification number) of the GMLC, and the like.

In operation 530, after receiving the Nudm_UECM_Registration Request, the UDM 500 may store, in subscriber information of the UE, the GMLC information as information associated with a UE context related to a UE location service, and may transmit Nudm_UECM_Registration Response to the GMLC.

Figure 6:
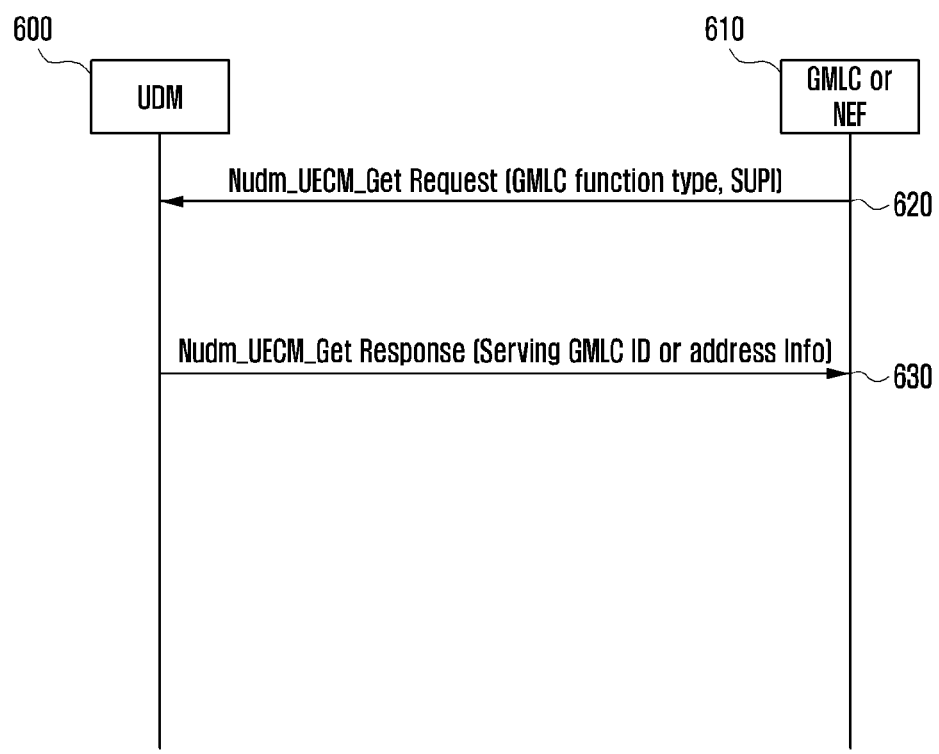
FIG. 6 is a diagram illustrating a procedure in which a GMLC or an NEF obtains, from a UDM, information associated with a GMLC that processes the location information associated with a UE, according to an embodiment of the disclosure.

FIG. 6 is a diagram illustrating a procedure in which a GMLC or an NEF obtains, from a UDM, information associated with a GMLC that processes the location information of a UE, according to an embodiment of the disclosure.

In operation 620, a GMLC or NEF 610 may transmit Nudm_UECM_Get Request to a UDM 600 in order to request the address or ID (identification number) information associated with a GMLC that processes the location information of the UE. In this instance, the Nudm_UECM_Get Request includes information indicating that the requested information is information associated with a GMLC that is processing the location information request associated with the UE and/or information associated with the corresponding UE (e.g., UE identification information (e.g., subscription permanent identifier (SUPI), or the like).

In operation 630, if the UDM 600 receives, from the GMLC or NEF 610, Nudm_UECM_Get Request that requests the address or ID information associated with the GMLC, the UDM 600 may return, to the GMLC or NEF 610, the ID or address of the GMLC that is processing the location information request associated with the UE via Nudm_UECM_Get Response.

Figure 7:
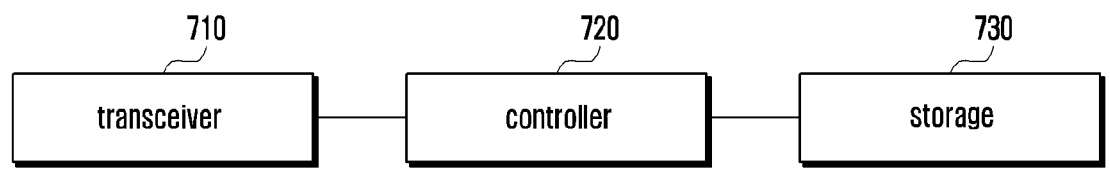
FIG. 7 is a diagram illustrating the structure of a UE according to an embodiment of the disclosure.

FIG. 7 is a diagram illustrating the structure of a UE according to an embodiment of the disclosure.

Referring to FIG. 7, the UE may include a transceiver 710, a controller 720, and a storage 730. In the disclosure, the controller may be defined as a circuit, an application-specified integrated circuit, or at least one processor.

The transceiver 710 may perform signal transmission or reception with another network entity. The transceiver 710 may receive, for example, system information from a base station, and may receive a synchronization signal or a reference signal.

The controller 720 may control overall operation of the UE according to the embodiments of the disclosure. For example, the controller 720 may control a signal flow among blocks so that operation is performed according to the flowcharts of FIG. 1 to FIG. 6. For example, the controller 720 may control operations proposed in the disclosure in order to process the location information of a UE which is concurrently produced in a mobile communication system according to an embodiment of the disclosure.

The storage 730 may store at least one piece of information among information transmitted or received via the transceiver 710 and information produced by the controller 720. For example, the storage 730 may store information needed for processing the location information of a UE which is concurrently produced in a mobile communication system according to the above-described embodiment.

Figure 8:
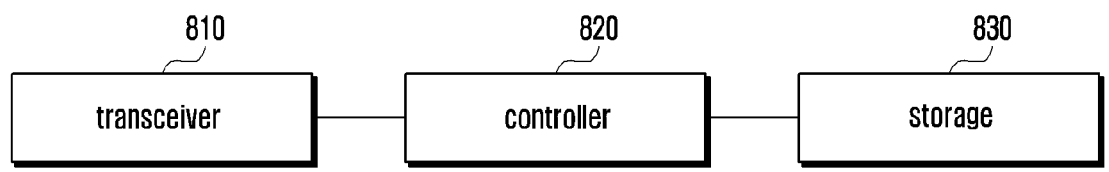
FIG. 8 is a diagram illustrating the structure of a base station according to an embodiment of the disclosure.

FIG. 8 is a diagram illustrating the structure of a base station according to an embodiment of the disclosure.

Referring to FIG. 8, the base station may include a transceiver 810, a controller 820, and a storage 830. In the disclosure, the controller may be defined as a circuit, an application-specified integrated circuit, or at least one processor.

The transceiver 810 may perform signal transmission or reception with another network entity. The transceiver 810 may transmit, for example, system information to a UE, and may transmit a synchronization signal or a reference signal.

The controller 820 may control overall operation of the base station according to the embodiments of the disclosure. For example, the controller 820 may control a signal flow among blocks so that operation is performed according to the flowcharts of FIG. 1 to FIG. 6. Particularly, the controller 820 may control operations proposed in the disclosure in order to process the location information of a UE which is concurrently produced in a mobile communication system according to an embodiment of the disclosure.

The storage 830 may store at least one piece of information among information transmitted or received via the transceiver 810 and information produced by the controller 820. For example, the storage 830 may store information needed for processing the location information of a UE which is concurrently produced in a mobile communication system according to the above-described embodiment.

Figure 9:
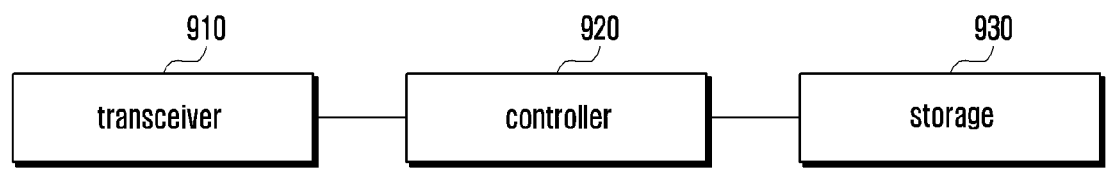
FIG. 9 is a diagram illustrating the structure of a GMLC or an NEF according to an embodiment of the disclosure.

FIG. 9 is a diagram illustrating the structure of a GMLC or an NEF according to an embodiment of the disclosure.

Referring to FIG. 9, the GMLC or NEF may include a transceiver 910, a controller 920, and a storage 930. In the disclosure, the controller may be defined as a circuit, an application-specified integrated circuit, or at least one processor.

The transceiver 910 may perform signal transmission or reception with another network entity. The transceiver 910 may receive, for example, system information from the AMF 120, and may receive a synchronization signal or a reference signal.

The controller 920 may control overall operation of the GMLC or NEF according to the embodiments of the disclosure. For example, the controller 920 may control a signal flow among blocks so that operation is performed according to the flowcharts of FIG. 1 to FIG. 5. For example, the controller 920 may control operations proposed in the disclosure in order to process the location information of a UE which is concurrently produced in a mobile communication system according to an embodiment of the disclosure.

The storage 930 may store at least one piece of information among information transmitted or received via the transceiver 910 and information produced by the controller 920. For example, the storage 930 may store information needed for processing the location information of a UE which is concurrently produced in a mobile communication system according to the above-described embodiment.

Figure 10:
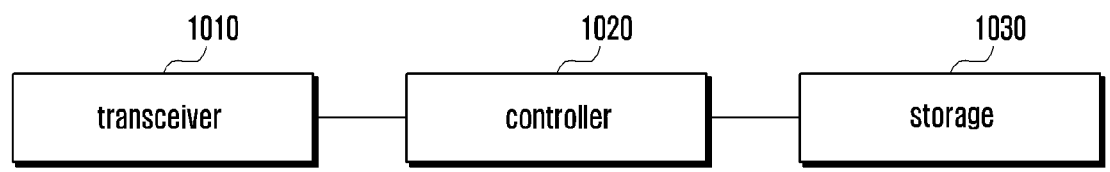
FIG. 10 is a diagram illustrating the structure of a UDM according to an embodiment of the disclosure.

FIG. 10 is a diagram illustrating the structure of a UDM according to an embodiment of the disclosure.

Referring to FIG. 10, the UDM may include a transceiver 1010, a controller 1020, and a storage 1030. In the disclosure, the controller may be defined as a circuit, an application-specified integrated circuit, or at least one processor.

The transceiver 1010 may perform signal transmission or reception with another network entity. The transceiver 1010 may transmit, for example, system information from the AMF 120, and may transmit a synchronization signal or a reference signal.

The controller 1020 may control overall operation of the UDM according to the embodiments of the disclosure. For example, the controller 1020 may control a signal flow among blocks so that operation is performed according to the flowcharts of FIG. 1 to FIG. 5. Particularly, the controller 1020 may control operations proposed in the disclosure in order to process the location information of a UE which is concurrently produced in a mobile communication system according to an embodiment of the disclosure.

The storage 1030 may store at least one piece of information among information transmitted or received via the transceiver 1010 and information produced by the controller 1020. For example, the storage 1030 may store information needed for processing the location information of a UE which is concurrently produced in a mobile communication system according to the above-described embodiment.

Although not explicitly illustrated in the disclosure, network entities illustrated in FIGS. 1 to 6 (e.g., the AMF 120, the LMF 130, the AF 210, or the like) may have structures identical or similar to those illustrated in FIGS. 7 to 10. For example, the AMF 120, the LMF 130, the AF 210, or the like may include a transceiver, a controller, and/or a storage.

In this instance, the transceiver may perform transmission or reception of a signal with another network entity. The transceiver may transmit, for example, system information to a base station, and may transmit a synchronization signal or a reference signal.

The controller may control overall operation of a corresponding network entity according to the embodiments of the disclosure. For example, the controller may control a signal flow among blocks so that operation is performed according to the flowcharts of FIG. 1 to FIG. 6. Particularly, the controller may control operations proposed in the disclosure in order to process the location information of a UE which is concurrently produced in a mobile communication system according to an embodiment of the disclosure.

The storage unit may store at least one piece of information transmitted or received via the transceiver, and information produced by the controller. For example, the storage may store information needed for processing the location information of a UE which is concurrently produced in a mobile communication system according to the above-described embodiment.

The invention claimed is:

1. A method performed by a user equipment (UE) location information processing gateway (gateway mobile location centre (GMLC)) of a mobile communication system, the method comprising:
   receiving, from a network entity that requires location information of a UE, a message that requests the location information of the UE;
   transmitting a message that requests the location information of the UE to an access and mobility management function (AMF) associated with the UE;
   receiving a message including the location information of the UE from the AMF; and
   transferring, to the network entity, a message including the location information of the UE received from the AMF.

2. The method of claim 1, wherein the transmitting of the message that requests the location information of the UE to the AMF comprises:
   transmitting, to a unified data management (UDM), a message for checking whether the GMLC is capable of providing the location information of the UE to the network entity;
   receiving, from the UDM, a message including confirmation information indicating that the GMLC is capable of providing the location information of the UE to the network entity; and
   transmitting, based on the confirmation information, the message that requests the location information of the UE to the AMF.

3. The method of claim 1, wherein the transmitting of the message that requests the location information of the UE to the AMF further comprises receiving information associated with the AMF from a unified data management (UDM).

4. The method of claim 1, wherein the transmitting of the message that requests the location information of the UE to the AMF comprises:
   identifying whether another GMLC that is processing the location information of the UE is present;
   if another GMLC that is processing the location information of the UE is present, transmitting a message that requests the location information of the UE to the another GMLC;
   receiving a message including the location information of the UE from the another GMLC; and
   transmitting the message that requests the location information of the UE to the AMF if another GMLC that is processing the location information of the UE is not present.

5. The method of claim 1, wherein the network entity is one of a location service client (LCS) or a network exposure function (NEF).

6. The method of claim 4, wherein the identifying of whether another GMLC that is processing the location information of the UE is present comprises:
   transmitting, to a unified data management (UDM), a message that requests identifying whether another GMLC that is processing the location information of the UE is present;
   receiving, from the UDM, a message including information associated with whether another GMLC that is processing the location information of the UE is present; and
   identifying, based on the information, whether another GMLC that is processing the location information of the UE is present.

7. The method of claim 1, wherein the message that requests the location information of the UE and is received from the network entity comprises at least one of an ID (identification number) of the UE, service requirements of location information, configuration information for expressing location information, a client type that requests location information, or a condition for reporting location information.

8. A user equipment (UE) location information processing gateway (a gateway mobile location centre (GMLS)) of a mobile communication system, comprising:
   a transceiver; and
   a controller configured to receive, via the transceiver from a network entity that requires location information of a UE, a message that requests the location information of the UE, to transmit a message that requests the location information of the UE to an access and mobility management function (AMF) associated with the UE via the transceiver, to receive a message including the location information of the UE from the AMF via the transceiver, and to transmit, to the network entity via the transceiver, a message including the location information of the UE received from the AMF.

9. The GMLS of claim 8, wherein, if the message that requests the location information of the UE is transmitted to the AMF via the transceiver, the controller is configured to transmit, to an unified data management (UDM) via the transceiver, a message for checking whether the GLMC is capable of providing the location information of the UE to the network entity, to receive, from the UDM via the transceiver, a message including confirmation information indicating that the GMLC is capable of providing the location information of the UE to the network entity, and to transmit, based on the confirmation information, the message that requests the location information of the UE to the AMF via the transceiver.

10. The GMLS of claim 8, wherein, if the message that requests the location information of the UE is transmitted to the AMF via the transceiver, the controller is configured to receive the information associated with the AMF from a unified data management (UDM) via the transceiver.

11. The GMLS of claim 8, wherein, if the message that requests the location information of the UE is transmitted to the AMF via the transceiver, the controller is configured to identify whether another GMLC that is processing the location information of the UE is present, to transmit a message that requests the location information of the UE to another GMLC if another GMLC that is processing the location information of the UE is present, to receive a message including the location information of the UE from the another GMLC via the transceiver, and to transmit a message that requests the location information of the UE to the AMF via the transceiver if another GMLC that is processing the location information of the UE is not present.

12. The GMLS of claim 8, wherein the network entity is one of a location service client (LCS) or a network exposure function (NEF).

13. The GMLS of claim 11, wherein, when identifying whether another GMLC that is processing the location information of the UE is present, the controller transmits, to a unified data management (UDM) via the transceiver, a message that requests identifying whether another GMLC that is processing the location information of the UE is present, to receive, from the UDM via the transceiver, a message including information associated with whether another GMLC that is processing the location information of the UE is present, and to identify, based on the information, whether the another GMLC that is processing the location information of the UE is present.

14. The GMLC of claim 8, wherein the message that requests the location information of the UE and is received from the network entity comprises an ID (identification number) of the UE, service requirements of the location information, configuration information for expressing location information, a client type that requests location information, or a condition for reporting location information.

* * * * *